United States Patent
Yoshikawa et al.

(10) Patent No.: US 7,123,395 B2
(45) Date of Patent: Oct. 17, 2006

(54) OPTICAL SCANNER AND IMAGE FORMATION APPARATUS INCLUDING THE OPTICAL SCANNER

(75) Inventors: Masanori Yoshikawa, Osaka (JP); Hideo Hirose, Osaka (JP); Masaaki Nakano, Osaka (JP); Ikuko Katoh, Kyoto (JP); Keisuke Fujimoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 5 days.

(21) Appl. No.: 11/001,494

(22) Filed: Dec. 1, 2004

(65) Prior Publication Data

US 2005/0116155 A1 Jun. 2, 2005

(30) Foreign Application Priority Data

Dec. 2, 2003 (JP) ............................. 2003-402876

(51) Int. Cl.
    G02B 26/08 (2006.01)
(52) U.S. Cl. .................................................. 359/204
(58) Field of Classification Search ................ 359/204, 359/209, 210, 198, 201; 347/243, 244
    See application file for complete search history.

(56) References Cited

U.S. PATENT DOCUMENTS 6,507,427 B1 * 1/2003 Yamawaki ................. 359/210

2002/0018112 A1 * 2/2002 Nishiguchi et al. ......... 347/259
2003/0156183 A1 * 8/2003 Ishihara ...................... 347/234

FOREIGN PATENT DOCUMENTS

| JP | 09-096769 | 4/1997 |
| JP | 2001-166239 | 6/2001 |

* cited by examiner

Primary Examiner—Euncha P. Cherry
(74) Attorney, Agent, or Firm—Harness, Dickey & Pierce, P.L.C.

(57) ABSTRACT

In an overfilled optical scanner in which a plurality of light beams are used, a uniform luminous-energy distribution is achieved on a scanning plane to be scanned. The optical scanner includes: a light source 3 for producing a first light beam L1 and a second light beam L2; a polygon mirror; a first image formation optical system for leading the light beams L1 and L2 to a deflecting plane of the polygon mirror and for forming, on the deflecting plane, a line image whose width is greater than the plane width of the deflecting plane; and a second image formation optical system for leading the light beams L1 and L2 from the polygon mirror to the scanning plane of a photosensitive drum and forming an image on the scanning plane. The first image formation optical system is adjusted so that the optical axes A1 and A2 of the first and second light beams L1 and L2 are approximately symmetrical about the optical axis A0 of the first image formation optical system. The powers of the first and second light beams L1 and L2 are thus balanced with each other on the scanning plane.

24 Claims, 17 Drawing Sheets

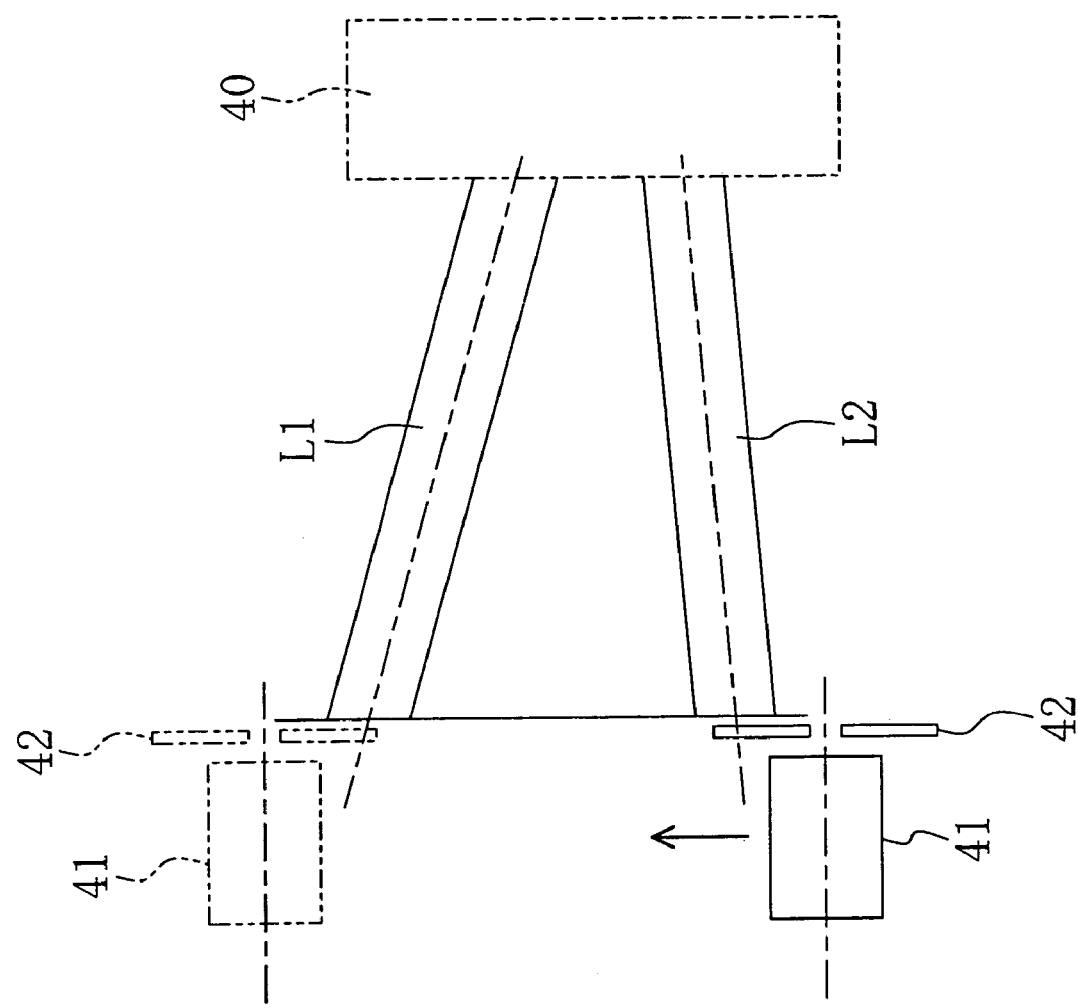

OPTICAL SCANNER AND IMAGE FORMATION APPARATUS INCLUDING THE OPTICAL SCANNER

CROSS-REFERENCE TO RELATED APPLICATION

The disclosure of Japanese Patent Application No. 2003-402876 filed on Dec. 2, 2003 including specification, drawings and claims is incorporated herein by reference in its entity.

BACKGROUND OF THE INVENTION

1. Technical Field to which the Invention Belongs

The present invention relates to an optical scanner and an image formation apparatus including the optical scanner.

2. Prior Art

Conventionally, optical scanners have been used for image formation apparatuses such as laser beam printers, laser facsimile machines and digital copy machines. Known as an optical scanner of this kind is an apparatus which includes a semiconductor laser serving as a light source, a polygon mirror (a rotating polygon mirror), a first image formation optical system for making a ray bundle from the semiconductor laser form a line image on the polygon mirror, a second image formation optical system for forming an image of uniform spots at a uniform velocity on a scanning plane, a scanning start signal detector for detecting a ray bundle scanned by the polygon mirror, and a detection optical system for gathering ray bundles from the semiconductor laser to the scanning start signal detector (see, e.g., Japanese Laid-Open Publication No. 2001-166239.)

In order to enhance the speed of image formation and achieve higher resolution, techniques for increasing scan speed have been developed. Proposed as one of those techniques is a so-called overfilled polygon optical scanner in which a light beam whose width is wider than the plane width of the individual deflecting planes of the polygon mirror is applied to the polygon mirror.

In an overfilled optical scanner, the deflecting planes of the polygon mirror cut off and reflect a portion of the incoming light beam and scan the reflected light. However, the portion of the light beam cut off by the deflecting planes varies depending upon the scan angle. Thus, the distribution of luminous energy in the scan line is significantly affected by the distribution of the intensity of the light beam.

When an optical scanner is designed, it is generally assumed that the beam profile (i.e., the energy distribution) of a light beam produced from the light source device is a Gaussian distribution, which is symmetrical about the peak of the beam intensity. Nevertheless, in the actual optical scanners, the beam profile is often not symmetrical about the peak due to errors caused in the fabrication of the light source device. Moreover, in some of the actual optical scanners, a displacement of the axis of the produced light occurs. To address this, an optical scanner aimed at achieving an approximately uniform luminous-energy distribution on a scanning plane has been proposed (see Japanese Laid-Open Publication No. 9-96769, which will be hereinafter referred to as a "patent reference").

In the optical scanner disclosed in the patent reference, powers of the light beam are detected in multiple positions, which correspond to a scanning plane to be scanned, and the optical axis is adjusted so that the ratio of any one of the detected powers to another is approximately 1 to 1.

In order to increase scan speed further, an overfilled optical scanner in which a plurality of light beams are used has been proposed. For example, as shown in FIG. 17A, a scanner, in which a light source 100 produces a first light beam L1 and a second light beam L2 and these two light beams L1 and L2 are directed to a polygon mirror, has been proposed.

However, in such a scanner in which a plurality of light beams are used, it is difficult to make the distribution of luminous energy uniform by using the above-described prior technique alone. More specifically, the above-described prior technique is intended to make a single light beam have a uniform luminous energy distribution. In other words, the prior technique makes the beam profile symmetrical as much as possible about the peak of the beam intensity.

Nevertheless, in a scanner in which a plurality of light beams are used, even if the beam profile of each light beam is made almost symmetrical, variations are likely to occur in the luminous energy distribution on the entire scanning plane due to displacements of the optical axes of the light beams. For example, in some cases, as shown in FIG. 17B, the peak position of the power of the first light beam L1 and the peak position of the power of the second light beam L2 are asymmetrical about a reference point (i.e., a point whose image height is zero). This results in a nonuniform luminous-energy distribution as a whole in some cases.

Therefore, a new technique for achieving a uniform luminous-energy distribution on the scanning plane in an optical scanner in which a plurality of light beams are used has been awaited.

In view of this, the present invention has been made and an object thereof is to achieve a uniform luminous-energy distribution on the scanning plane in an overfilled optical scanner in which a plurality of light beams are used.

SUMMARY OF THE INVENTION

An inventive optical scanner includes: a light source for emitting a plurality of light beams; an optical deflector for scanning the light beams from the light source; a first image formation optical system, arranged between the light source and the optical deflector, for leading the light beams from the light source to a deflecting plane of the optical deflector and for forming, on the deflecting plane, a line image whose width is greater than the plane width of the deflecting plane; and a second image formation optical system, arranged between the optical deflector and a scanning plane to be scanned, for leading the light beams from the optical deflector to the scanning plane and forming an image on the scanning plane, wherein the first image formation optical system is adjusted so that powers of the light beams are balanced with each other on the scanning plane.

In the inventive optical scanner, the powers of the light beams are balanced with each other on the scanning plane. Thus, the luminous energy distribution on the entire scanning plane becomes uniform. Accordingly, the speed of scanning is increased, while high quality is achieved in the optical scanner.

Another inventive optical scanner includes: a light source for emitting a plurality of light beams; an optical deflector for scanning the light beams from the light source; a first image formation optical system, arranged between the light source and the optical deflector, for leading the light beams from the light source to a deflecting plane of the optical deflector and for forming, on the deflecting plane, a line image whose width is greater than the plane width of the deflecting plane; and a second image formation optical system, arranged between the optical deflector and a scanning plane to be scanned, for leading the light beams from the optical deflector to the scanning plane and forming an image on the scanning plane, wherein the first image formation optical system is adjusted so that two of optical axes of the light beams, directed to outermost ends, are approximately symmetrical about an optical axis of the first image formation optical system.

In the inventive optical scanner, since the two of the optical axes of the light beams, directed to the outermost ends, are approximately symmetrical about the optical axis of the first image formation optical system, the powers of the light beams are balanced with each other on the scanning plane. The luminous energy distribution on the entire optical scanning plane thus becomes uniform. Accordingly, the speed of scanning is increased, while high quality is achieved in the optical scanner.

Another inventive optical scanner includes: a light source for emitting two light beams; an optical deflector for scanning the light beams from the light source; a first image formation optical system, arranged between the light source and the optical deflector, for leading the light beams from the light source to a deflecting plane of the optical deflector and for forming, on the deflecting plane, a line image whose width is greater than the plane width of the deflecting plane; and a second image formation optical system, arranged between the optical deflector and a scanning plane to be scanned, for leading the light beams from the optical deflector to the scanning plane and forming an image on the scanning plane, wherein the first image formation optical system is adjusted so that optical axes of the two light beams are approximately symmetrical about an optical axis of the first image formation optical system.

In the inventive optical scanner, the light source produces the two light beams, whose optical axes are approximately symmetrical about the optical axis of the first image formation optical system, allowing the powers of the two light beams to be balanced on the scanning plane. The luminous energy distribution on the entire optical scanning plane thus becomes uniform. Accordingly, the speed of scanning is increased, while high quality is achieved in the optical scanner.

The inventive scanners may further include a collimator lens for converting the light beams emitted from the light source into parallel rays, and a moving mechanism for moving the light source from an optical axis of the collimator lens in the scanning direction for said adjustment of the first image formation optical system.

Then, the moving mechanism moves the light source from the optical axis of the collimator lens in the scanning direction, whereby the first image formation optical system is adjusted.

The inventive scanners may further include a lens through which the light beams emitted from the light source pass and which has a power in the scanning direction, and a moving mechanism for moving the lens in the scanning direction for said adjustment of the first image formation optical system.

Then, the moving mechanism moves the lens in the scanning direction, whereby the first image formation optical system is adjusted.

The inventive scanners may further include a deflecting mirror for deflecting the light beams emitted from the light source, and an angle changing mechanism for changing an angle at which the deflecting mirror deflects the light beams with respect to the scanning direction for said adjustment of the first image formation optical system.

Then, the angle changing mechanism changes the deflection angle of the deflecting mirror, whereby the first image formation optical system is adjusted.

The inventive scanners may further include: a collimator lens for converting the light beams emitted from the light source into parallel rays; a light source block for holding at least the light source and the collimator lens; and an orientation changing mechanism for changing the orientation of the light source block with respect to the scanning direction for said adjustment of the first image formation optical system.

Then, the orientation changing mechanism changes the orientation of the light source block, whereby the first image formation optical system is adjusted.

The inventive scanners may further include: a collimator lens for converting the light beams emitted from the light source into parallel rays; a light source block for holding at least the light source and the collimator lens; and a moving mechanism for moving the light source block in the scanning direction for said adjustment of the first image formation optical system.

Then, the moving mechanism changes the location of the light source block in the scanning direction, whereby the first image formation optical system is adjusted.

It is preferable that powers of the light beams incident upon the optical deflector are detected and that said adjustment of the first image formation optical system is made based on the detection.

Then, the adjustment of the first image formation optical system is made based on the actually detected values of the light beams incident upon the optical deflector. Accordingly, the first image formation optical system is adjusted highly accurately.

In the inventive scanners, the light source is preferably formed of a multiple-light-emitting light source having a plurality of light emitting points arranged in a line and each emitting a corresponding one of the light beams. The scanners preferably further include a light source holder for holding the multiple-light-emitting light source in such a manner that the direction in which the light emitting points are arranged is inclined with respect to the scanning direction in which the light beams are scanned, and an adjustment mechanism for adjusting the inclination angle of the light-emitting-point arrangement direction with respect to the scanning direction. And in the inventive scanners, it is preferable that after the adjustment mechanism adjusts the inclination angle to thereby adjust a distance between the light beams on the scanning plane in a sub scanning direction perpendicular to the scanning direction, said adjustment of the first image formation optical system is made.

In the inventive scanner, the light source is preferably formed of a multiple-light-emitting light source having two light emitting points arranged in a line and each emitting a corresponding one of the light beams. The scanner preferably further includes a light source holder for holding the multiple-light-emitting light source in such a manner that the direction in which the light emitting points are arranged is inclined with respect to the scanning direction in which the light beams are scanned, and an adjustment mechanism for adjusting the inclination angle of the light-emitting-point arrangement direction with respect to the scanning direction. And in the inventive scanner, it is preferable that after the adjustment mechanism adjusts the inclination angle to thereby adjust a distance between the light beams on the scanning plane in a sub scanning direction perpendicular to the scanning direction, said adjustment of the first image formation optical system is made.

Then, it is possible to adjust any errors in the distance between the light beams on the scanning plane in the sub scanning direction, caused due to errors in the distance between the light-emitting points or due to errors in assembly of the first and second image formation optical systems, for example. In addition, it is also possible to easily adjust the balance between the powers of the light beams on the scanning plane in the scanning direction and the distance between the light beams on the scanning plane in the sub scanning direction.

In the inventive scanners, the second image formation optical system is preferably formed of a reflector having a reflection plane formed of a curved plane which has a long side extending in the scanning direction in which the light beams are scanned and a positive power at least in the scanning direction.

If the reflection plane of the reflector is formed of a so-called free-form surface, the second image formation optical system can be formed of the reflector alone, which reduces the number of components required.

An inventive image formation apparatus includes: the optical scanner; an approximately cylindrical photosensitive body whose rim surface forms the scanning plane to be scanned and which extends in the scanning direction in which a ray bundle is scanned in the optical scanner; a driving mechanism for rotating the photosensitive body; a developer for supplying toner to the photosensitive body; and transferer for transferring a toner image formed on the photosensitive body to a recording medium.

Then, image forming speed is enhanced and image quality is increased in the image formation apparatus.

Effects of the Invention

According to the present invention, the first image formation optical system is adjusted so that the powers of the light beams are balanced on the scanning plane. Thus, in the overfilled optical scanner in which the plurality of light beams are used, the distribution of luminous energy on the scanning plane is made uniform.

The two of the optical axes of the light beams, directed to the outermost ends, are made approximately symmetrical about the optical axis of the first image formation optical system, which permits the distribution of luminous energy on the scanning plane to become uniform as a whole.

If the light source is designed to produce two light beams whose optical axes are approximately symmetrical about the optical axis of the first image formation optical system, the distribution of luminous energy on the scanning plane becomes uniform as a whole.

The first image formation optical system can be adjusted favorably by moving the collimator lens for converting the light beams from the light source into parallel rays, by moving, in the scanning direction, the lens through which the light beams from the light source pass, by changing the angle at which the deflecting mirror deflects the light beams from the light source, by changing the orientation of the light source block for holding at least the light source and the collimator lens, or by moving the light source block in the scanning direction.

If the powers of the light beams incident upon the optical deflector are detected and the first image formation optical system is adjusted based on the detection, the first image formation optical system is adjusted highly accurately.

If the adjustment mechanism adjusts the distance between the light beams on the scanning plane in the sub scanning direction before the first image formation optical system is adjusted so that the powers of the light beams are balanced on the scanning plane, the adjustment of the first image formation optical system is accomplished more easily as compared to a case where the distance between the light beams on the scanning plane in the sub scanning direction is adjusted after the first image formation optical system is adjusted.

BRIEF DESCRIPTION OF THE DRAWINGS

FIG. 5A is a plan view of a light source block, while

FIG. 6A is a plan view of a light source block, while

FIG. 8A is a plan view of a light source block, while

FIG. 9A is a plan view of a light source block, while

FIG. 10 illustrates the configuration of a measuring device for detecting light beam power.

FIG. 17A is a conceptual view illustrating a light source and light beams, while

DESCRIPTION OF THE PREFERRED EMBODIMENTS

Hereinafter, embodiments of the present invention will be described in detail with reference to the accompanying drawings.

Figure 1:
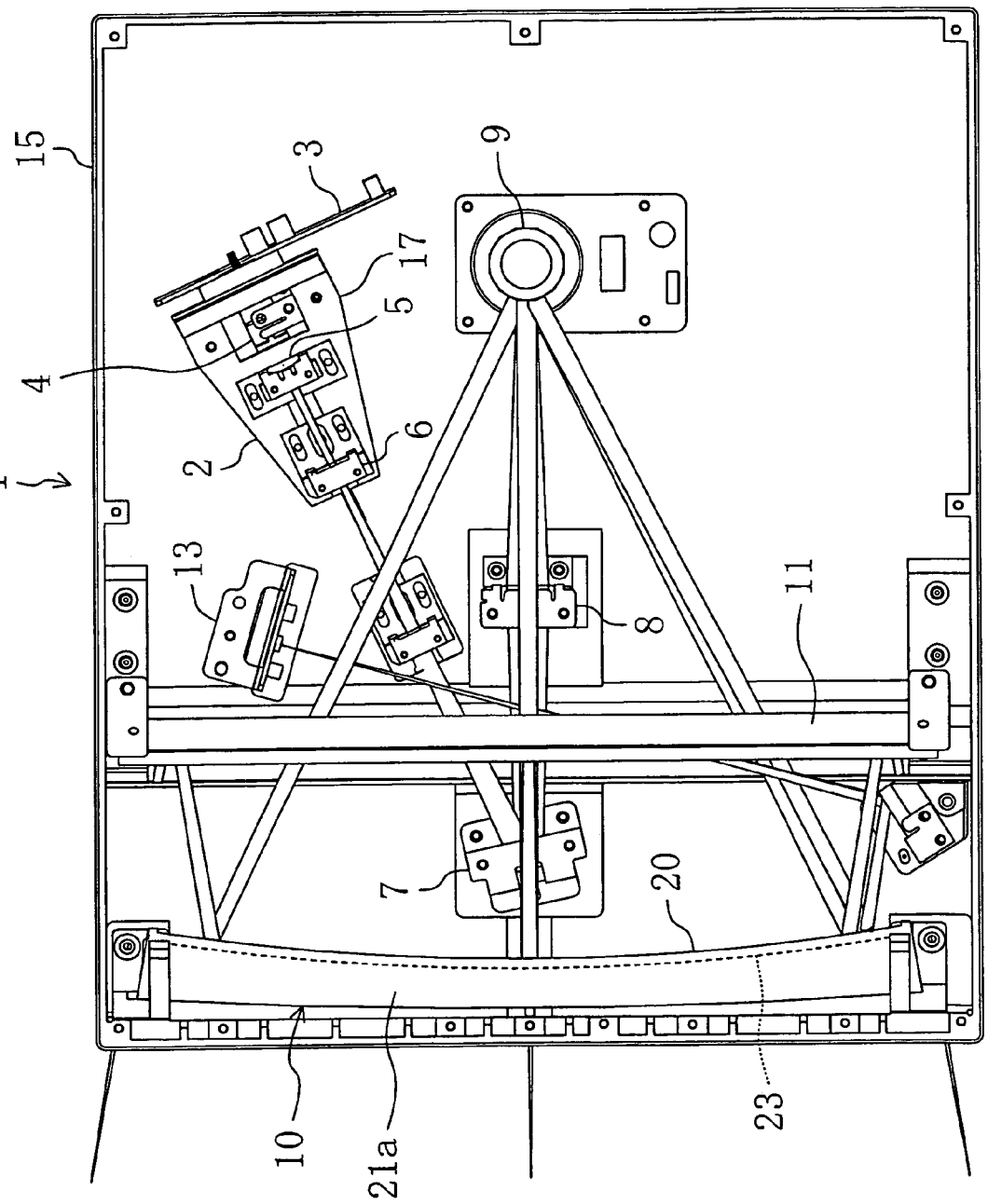
FIG. 1 is a plan view of an optical scanner according to this embodiment.
Figure 2:
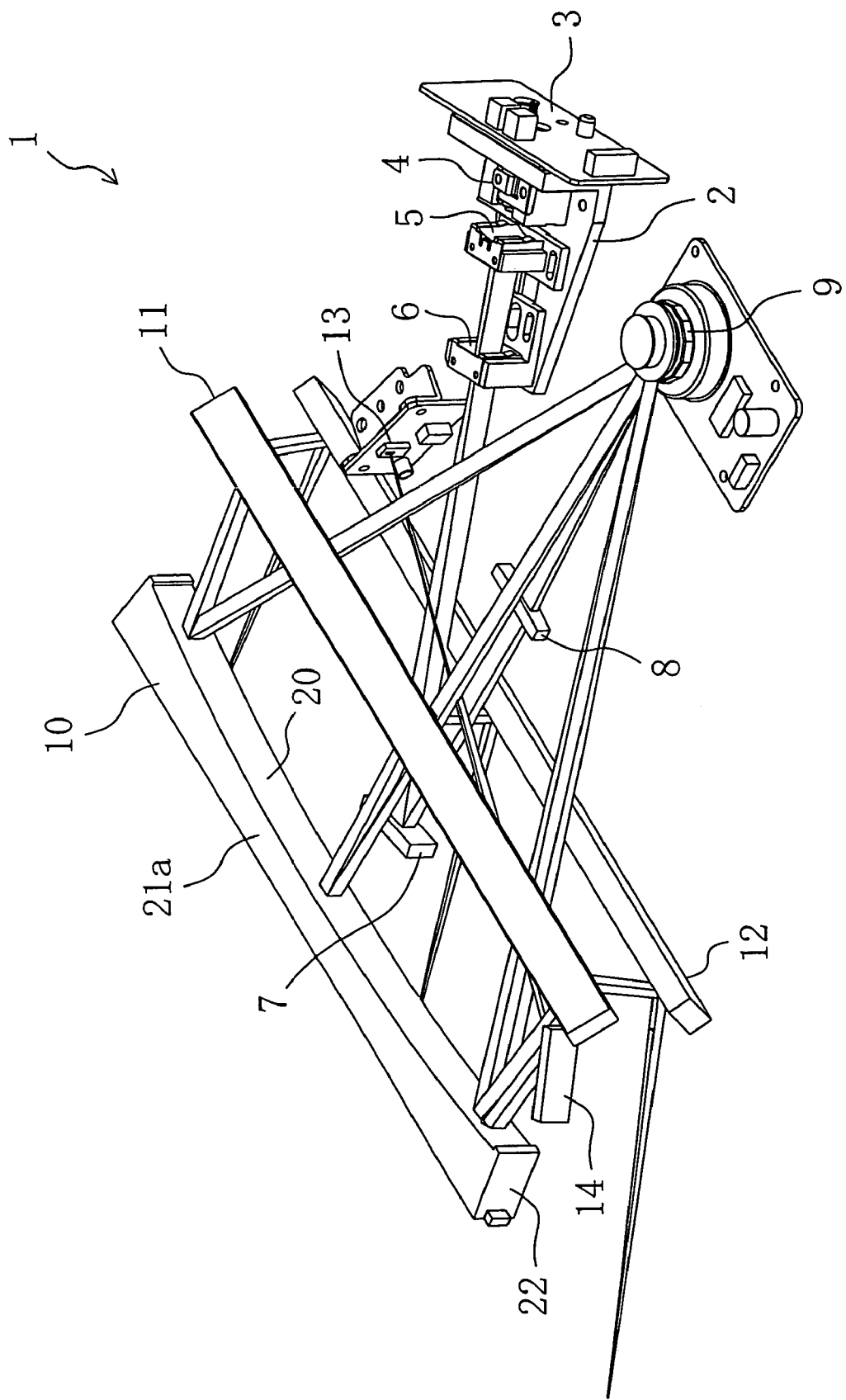
FIG. 2 is an oblique view of the main part of the optical scanner of this embodiment.

As shown in FIGS. 1 and 2, an optical scanner 1 according to this embodiment includes a light source block 2, a polygon mirror 9, a reflector 10 and a synchronization sensor 13. These members are provided in a case 15. In the following description, the right hand side of FIG. 1 will be referred to as a "rear side" and the left hand side of FIG. 1 will be referred to as a "front side" for convenience.

The light source block 2 includes a light source 3 and a lens block 17 in which a collimator lens 4, a main concave cylinder lens 5 and a sub convex cylinder lens 6 are placed. The light source 3 is formed of a laser driving substrate (i.e., a semiconductor laser) on which a semiconductor laser circuit is provided. The light source 3 and the lens block 17 are assembled into one piece. The light source 3, which emits two laser beams, is configured to produce a first laser beam L1 and a second laser beam L2 at the same time (see FIG. 4A). A deflecting mirror 7 is provided in a position to which the laser beams from the light source block 2 are directed, i.e., in a position forward of the light source block 2. A main convex cylinder lens 8 is provided between the deflecting mirror 7 and the polygon mirror 9.

The collimator lens 4, the main concave cylinder lens 5, the sub convex cylinder lens 6, and the main concave cylinder lens 8 lead the beams (a ray bundle) from the light source 3 to a deflecting plane of the polygon mirror 9, and also together form a first image formation optical system for forming a line image on the deflecting plane.

The polygon mirror 9 is a rotating polygon mirror including a plurality of reflection planes (i.e., deflecting planes) and is rotary-driven by a not-shown motor. By the rotation of the polygon mirror 9, the light reflected at the polygon mirror 9 is scanned. The optical scanner 1 is an overfilled optical scanner, in which the width of the beams applied to the polygon mirror 9 is greater than the plane width of the individual deflecting planes. In other words, the first image formation optical system is configured to form, on one or more of the deflecting planes of the polygon mirror 9, a line image whose width is greater than the width of those deflecting planes.

The reflector 10 for reflecting the beams from the polygon mirror 9 is provided forward of the deflecting mirror 7. The reflector 10 forms a second image formation optical system for leading the beams from the polygon mirror 9 to a scanning plane of a photosensitive drum 16 (see FIG. 3) and forming an image of uniform spots at a uniform velocity on the scanning plane. The reflector 10 is formed having a long side along the direction in which the light is scanned, and has a reflection plane 20 extending in the scanning direction. The reflector 10 includes a thin-plate-shaped reflector body 23 having the reflection plane 20, upper and lower ribs 21a each extending from an upper or lower end of the reflector body 23 in the back side direction (i.e., the left hand side direction in FIG. 1), and end portion ribs 22 each extending from a right or left end of the reflector body 23 in the back side direction. These components of the reflector 10 are formed as one unit by using synthetic (plastic) resin.

A metal layer is formed on one plane (an obverse side plane) of the reflector body 23 and the metal layer forms the reflection plane 20 serving as a mirror surface. The reflection plane 20 is a curved plane having a long side in the direction in which the ray bundle is scanned and having a positive power at least in the scanning direction. The reflection plane 20 is a three-dimensional curved plane having an approximate C shaped lateral cross section and also an approximate C shaped longitudinal cross section. Furthermore, the reflection plane 20 is formed of a so-called free-form surface whose lateral cross section does not have a constant shape in the long side direction, so that the second image formation optical system is formed of the reflector 10 alone. However, in cases where the second image formation optical system is not to be formed of the reflector 10 alone, the reflection plane 20 of the reflector 10 does not have to be a free-form surface.

As shown in FIG. 2, deflecting mirrors 11 and 12 are provided in the rear of the reflector 10. Like the reflector 10, the deflecting mirrors 11 and 12 are both formed having a long length. The deflecting mirror 12 is provided under the deflecting mirror 11. The beams reflected at the reflector 10 are reflected by the deflecting mirrors 11 and 12 in this order and then directed frontward.

A deflecting mirror 14 is provided rearwardly of the start point of the scanning direction in the reflector 10 (i.e., rearwardly of the position of an end portion in the left hand side of FIG. 2.) Only when the beams are at that start point, the deflecting mirror 14 reflects the light. The light reflected at the deflecting mirror 14 enters into the synchronization sensor 13. That is, at the start time of scanning, the light is entered into the synchronization sensor 13 and the synchronization sensor 13 detects that the scan is started.

Figure 3:
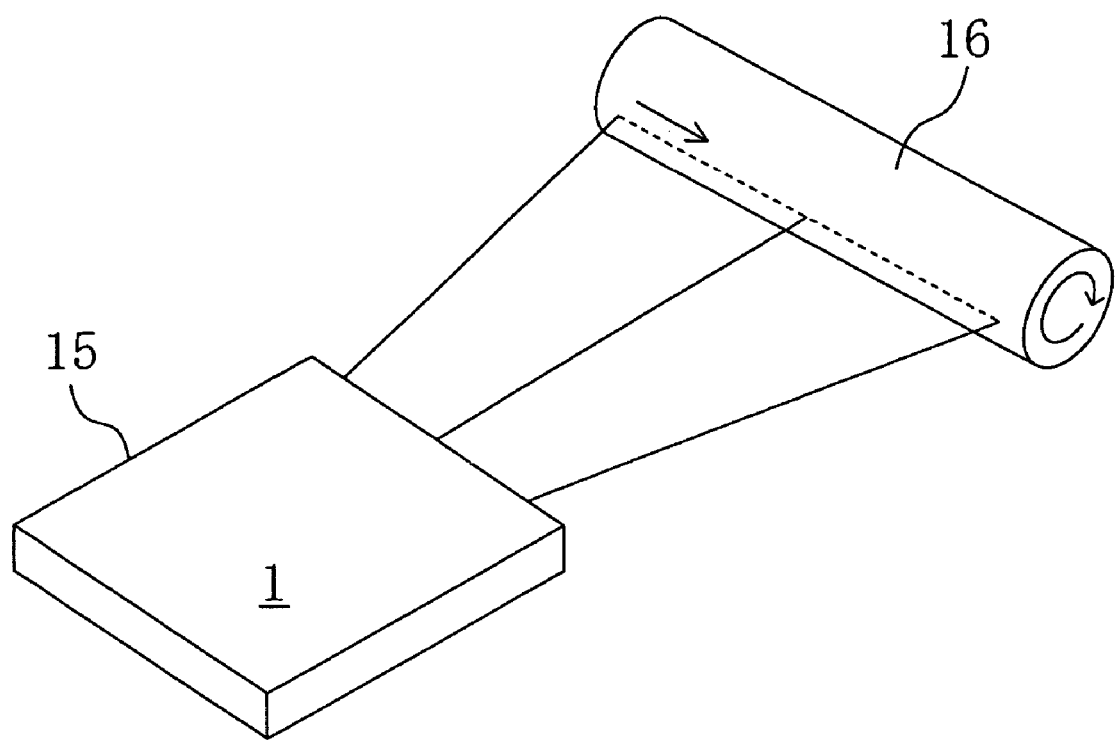
FIG. 3 is an oblique view of the optical scanner and a photosensitive drum.

As shown in FIG. 3, the beams produced from the optical scanner 1 are lead onto the cylindrical photosensitive drum 16. The rim surface of the photosensitive drum 16 forms a scanning plane on which the beams from the optical scanner 1 are scanned, and is covered with a photosensitive body whose electric charge varies when the photosensitive body is irradiated. The beams from the optical scanner 1 are scanned, so that the beam spots are scanned on the photosensitive drum 16 in the parallel direction to the axis direction of the photosensitive drum 16 (i.e., the scanning direction). The photosensitive drum 16 is rotary-driven by a not-shown motor (i.e., a driving mechanism). By this combination of the scanning of the beams and the rotation of the photosensitive drum 16, a two-dimensional latent image is formed on the surface of the photosensitive drum 16.

Figure 4A:
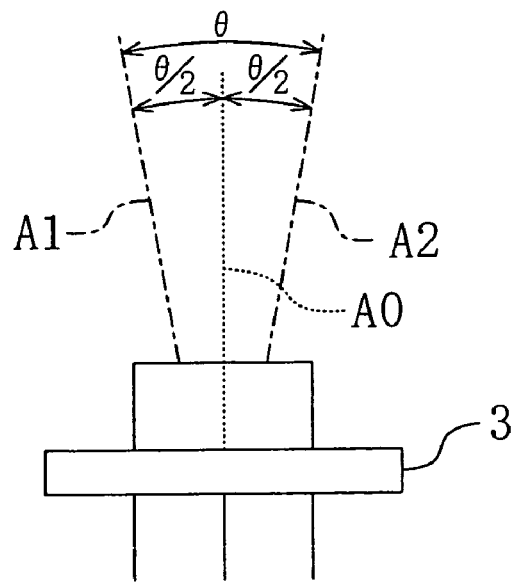
FIG. 4A is a conceptual view indicating relation between the optical axis of a first image formation optical system and the optical axes of light beams.

As shown in FIG. 4A, in the optical scanner 1, the first image formation optical system is adjusted so that the optical axes A1 and A2 of the first and second light beams L1 and L2 produced from the light source 3 are approximately symmetrical about the optical axis A0 of the first image formation optical system. More specifically, if the angle between the optical axes A1 and A2 of the first and second light beams L1 and L2 is θ, the angles between the optical axis A1 of the first light beam L1 and the optical axis A0 of the first image formation optical system and between the optical axis A2 of the second light beam L2 and the optical axis A0 of the first image formation optical system are both about θ/2.

Consequently, the peak position of the power of the first light beam L1 and the peak position of the power of the second light beam L2 are approximately symmetrical with respect to a reference point (i.e., a point whose image height is zero) in the scanning plane. Therefore, the power of the first light beam L1 and the power of the second light beam L2 on the scanning plane are balanced with each other in the optical scanner 1.

Next, specific adjusting means for adjusting the first image formation optical system will be discussed. Several means are applicable as the means for adjusting the first image formation optical system.

Figure 5A:
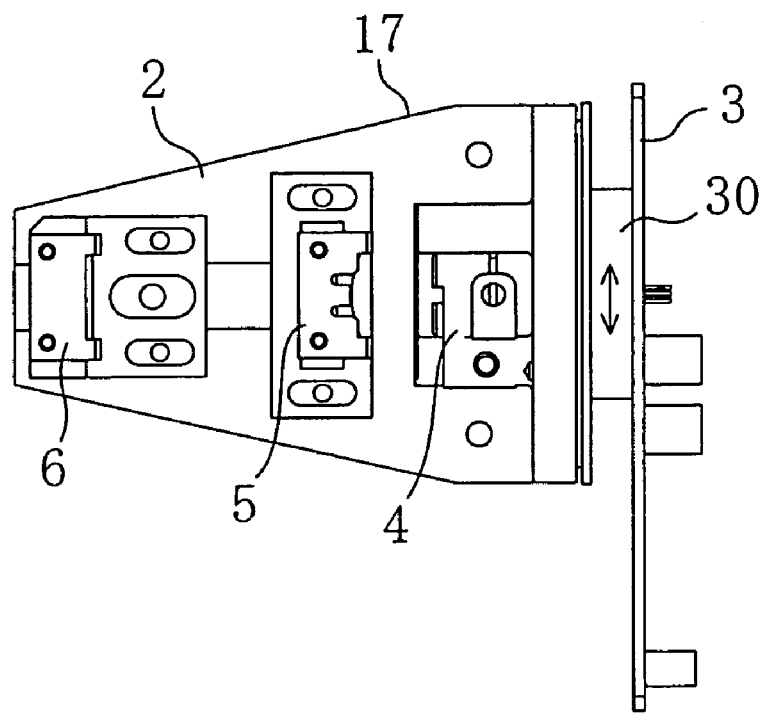
Figure 5B:
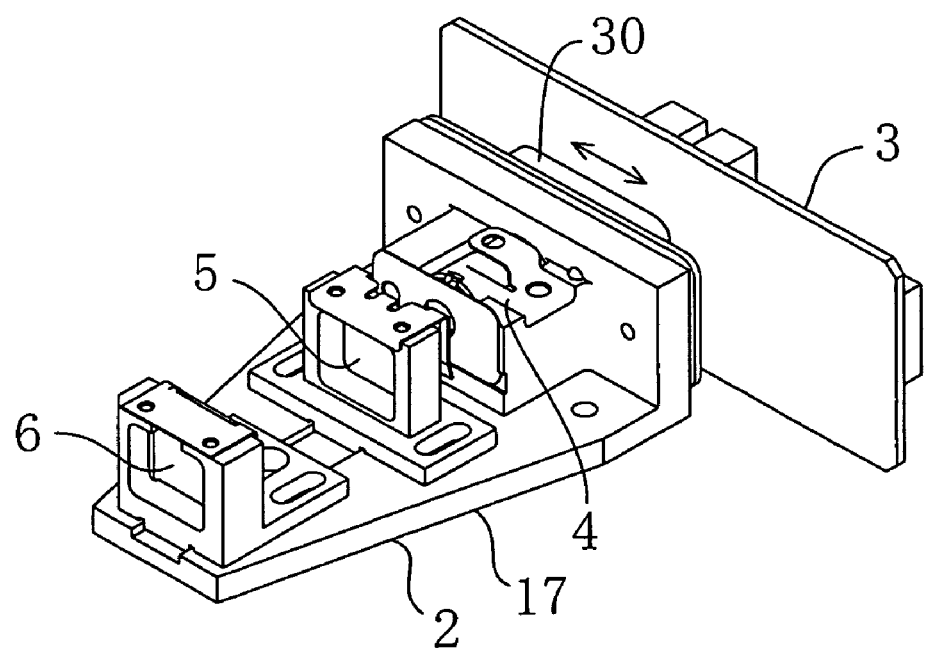
FIG. 5B is an oblique view of the light source block.

For example, a moving mechanism for moving the light source 3 from the optical axis of the collimator lens 4 in the scanning direction may be provided. More specifically, as shown in FIG. 5, a laser holder 30, which allows relative movement of the light source 3 and the lens block 17 in the scanning direction, may be disposed between the light source 3 and the lens block 17. This adjustment means moves the light source 3 from the optical axis of the collimator lens 4 in the scanning direction, thereby adjusting the first image formation optical system.

Figure 6A:
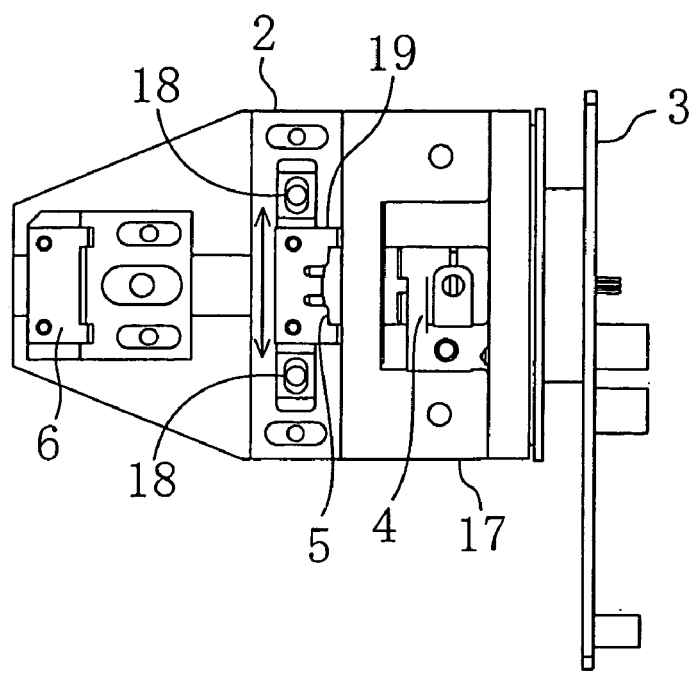
Figure 6B:
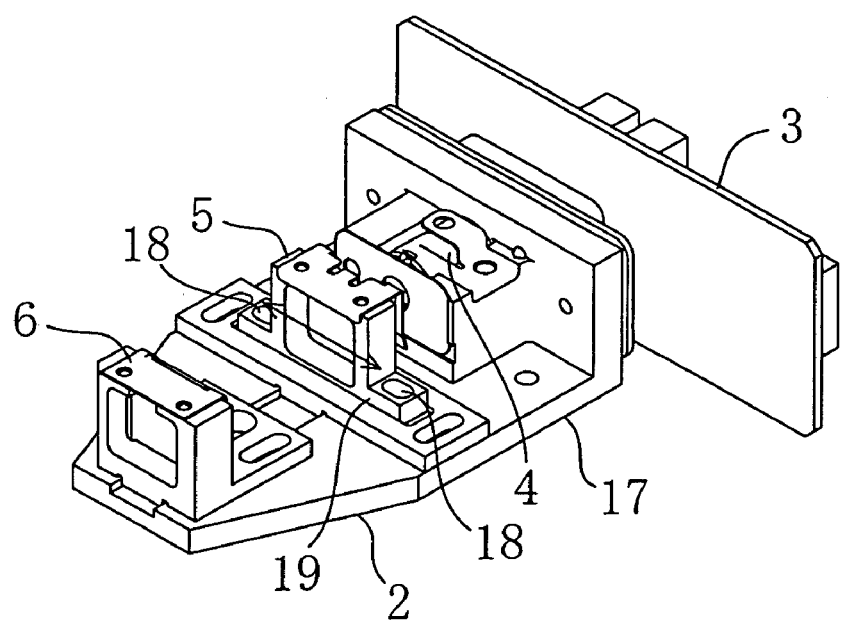
FIG. 6B is an oblique view of the light source block.

Alternatively, another moving mechanism may be provided for moving, in the scanning direction, a lens through which the light beams from the light source 3 pass and which has a power in the scanning direction. For example, as shown in FIG. 6, elongated screw holes 18, which are elongated in the left-right direction, may be formed at the left and right ends (i.e., at the upper and lower ends in FIG. 6A) of a supporting board 19 which supports the main concave cylinder lens 5, and the location of the supporting board 19 in the left-right direction may be adjusted when the supporting board 19 is secured to the lens block 17. The main concave cylinder lens 5 is a lens having a power in the scanning direction, and the location of the main concave cylinder lens 5 in the scanning direction can be adjusted by adjusting the positions, in the left-right direction, of fixing screws in the screw holes 18. In this way, this adjustment means adjusts the first image formation optical system by moving the main concave cylinder lens 5 in the scanning direction.

Figure 7:
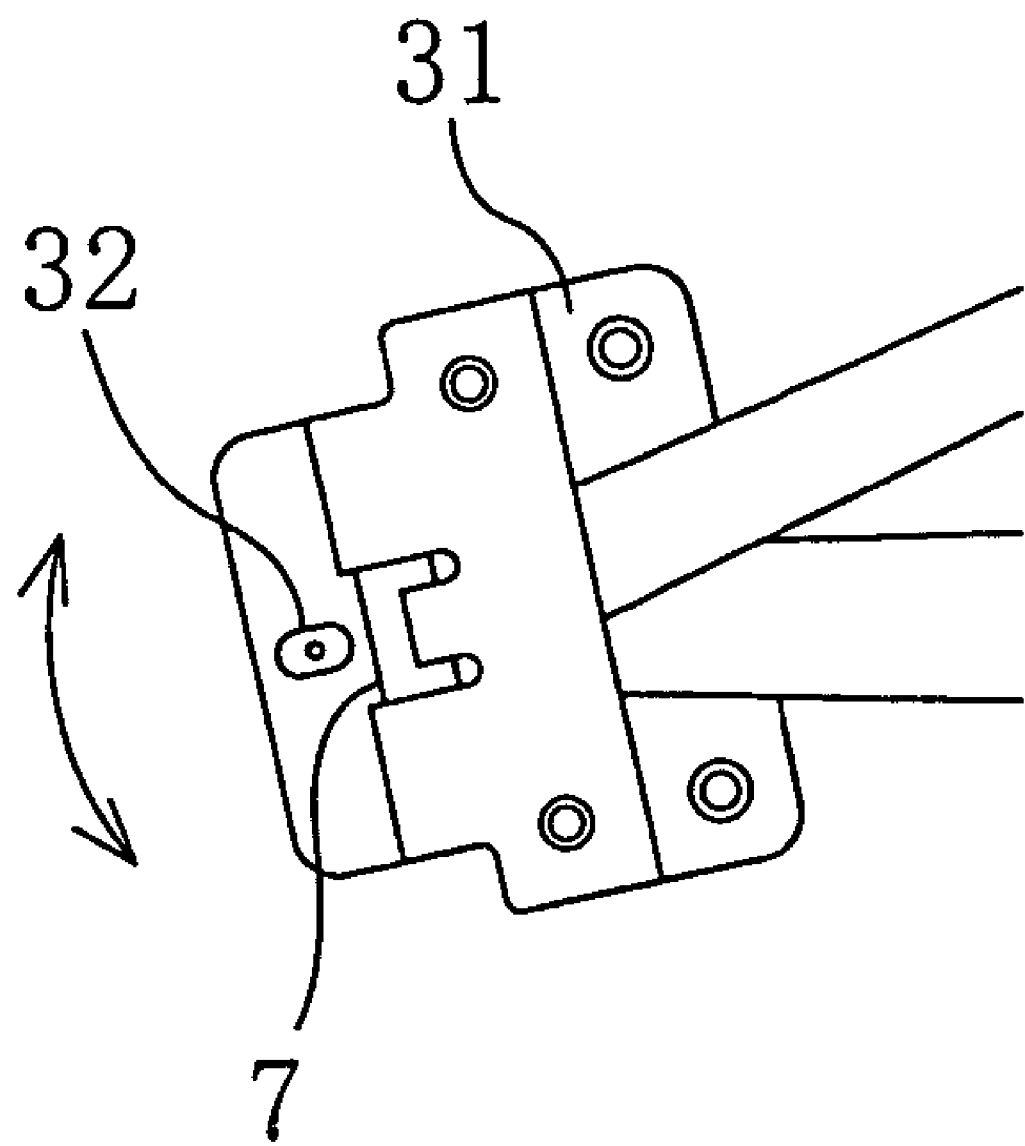
FIG. 7 is a plan view of a deflecting mirror.

Another alternative is to provide an angle-changing mechanism for changing the angle at which the deflecting mirror 7 deflects the light beams with respect to the scanning direction. That is, as shown in FIG. 7, the first image formation optical system may be adjusted by changing the deflection angle of the deflecting mirror 7. For example, an angle-adjusting hole 32 may be provided at one end of a holder 31 supporting the deflecting mirror 7, and by adjusting the screw position of an angle adjusting screw (not shown) in the angle-adjusting hole 32, the deflection angle of the deflecting mirror 7 may be adjusted. In this manner, the first image formation optical system may be adjusted by adjusting the deflection angle of the light beams L1 and L2 deflected by the deflecting mirror 7 with respect to the scanning direction.

Figure 8A:
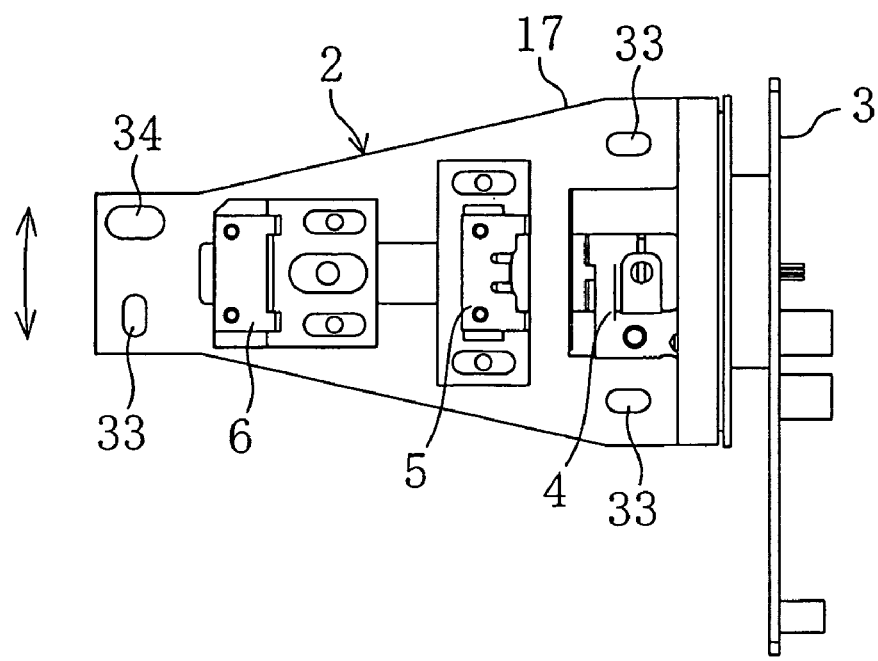
Figure 8B:
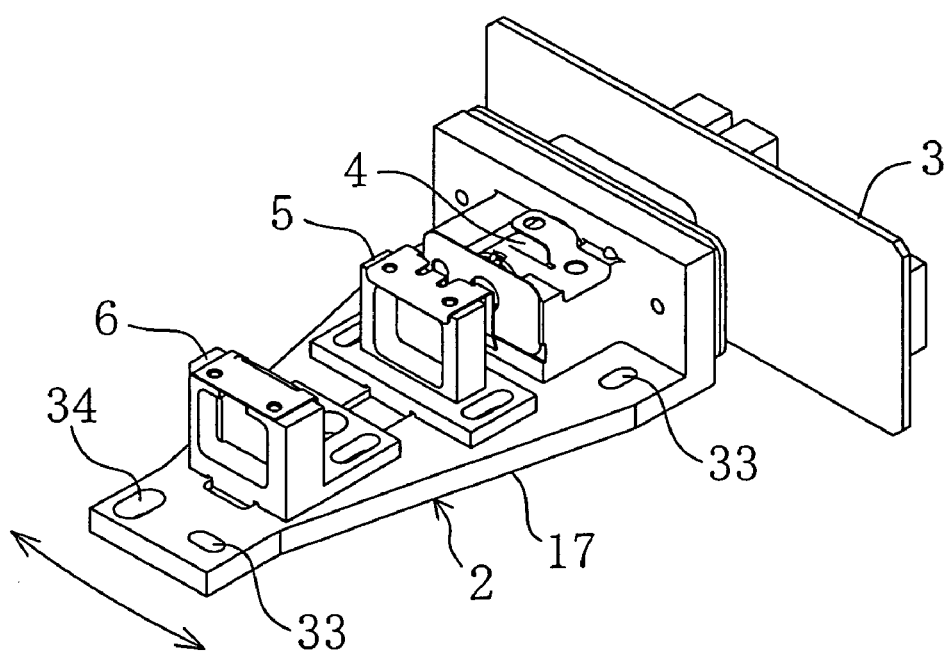
FIG. 8B is an oblique view of the light source block.

Another alternative is to provide an orientation-changing mechanism for changing the orientation of the light source block 2 with respect to the scanning direction. For example, as shown in FIG. 8, one of the holes 33 for fixing screws for securing the lens block 17 may be formed having an elongated shape and used as an angle-adjusting hole 34 for adjusting the orientation of the light source block 2. An angle-adjusting eccentric pin (not shown) is inserted into the angle-adjusting hole 34, and by the rotation of the inserted eccentric pin, the orientation of the light source block 2 in the scanning direction can be changed, thereby adjusting the first image formation optical system.

Figure 9A:
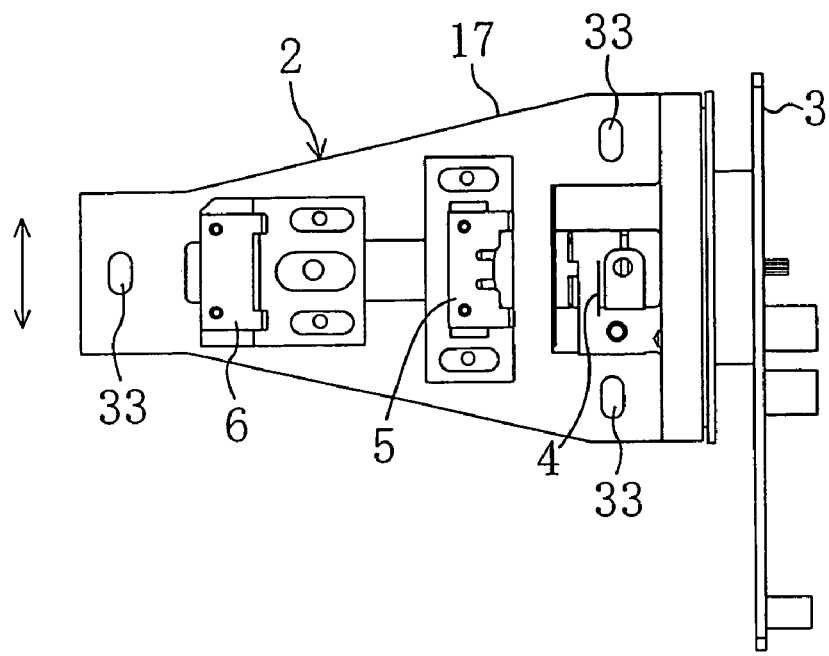
Figure 9B:
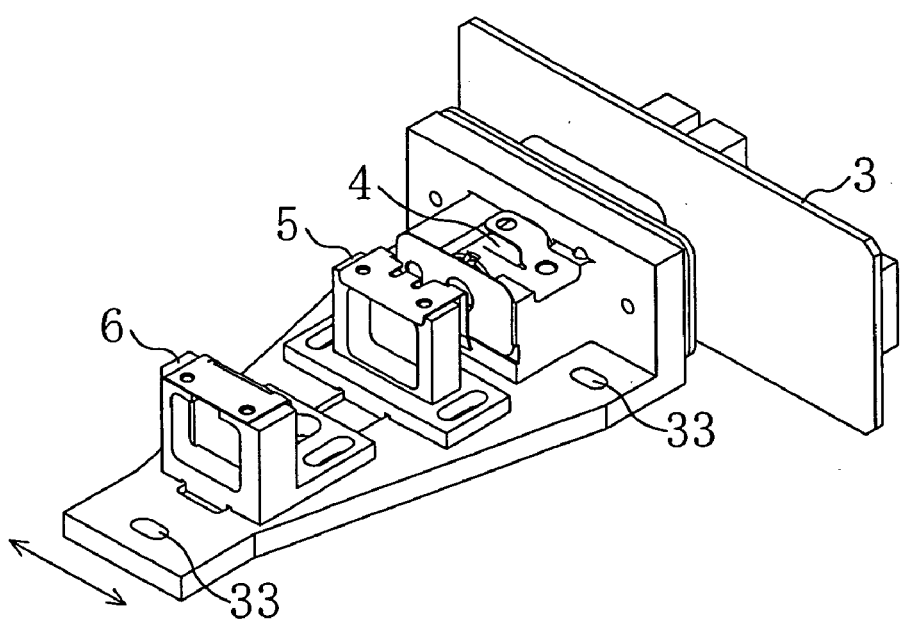
FIG. 9B is an oblique view of the light source block.

Another alternative is to provide a moving mechanism for moving the light source block 2 in the scanning direction. For example, as shown in FIG. 9, the holes 33 for fixing screws for securing the lens block 17 may be formed having an elongated shape in the scanning direction, and may be used for adjusting the location of the light source block 2 in the scanning direction when the lens block 17 is secured. In this way, this adjusting means adjusts the first image formation optical system by moving the light source block 2 in the scanning direction.

Although each of the adjusting means set forth above may be used by itself to adjust the first image formation optical system, it is obvious that two or more of them may be used in combination to adjust the first image formation optical system. In particular, if the means for moving the collimator lens 4 or the main concave cylinder lens 5, the means for changing the angle of the deflecting mirror 7, or the means for changing the orientation of the light source block 2 (which changes the direction of the light beams) is combined with the means for moving the light source block 2 in the scanning direction, the combination functions effectively.

If the moving mechanism for moving the light source 3 from the optical axis of the collimator lens 4 or the moving mechanism for moving the main concave cylinder lens 5 in the scanning direction is used, only the light source block 2 is required to be adjusted. Therefore, the first image formation optical system can be adjusted before the light source block 2 is incorporated into the case 15, which makes the adjustment easier.

Next, an exemplary method for adjusting the first image formation optical system will be discussed. In the exemplary adjusting method, powers of the light beams incident on the polygon mirror 9 are detected beforehand, and the first image formation optical system is adjusted based on the detection results.

FIG. 10 illustrates the configuration of a measuring device for detecting light beam power. In the measuring device, the first and second light beams L1 and L2 in the form of a ray bundle, produced from the light source block 2, are separated from each other, after they pass through a magnification optical system 40. A photo sensor 41 and slits 42 are provided where the first and second light beams L1 and L2 are separated from each other sufficiently. The photo sensor 41 and slits 42 are furnished with a driving mechanism (not shown) and move together in the direction indicated by an arrow in FIG. 10.

This movement of the photo sensor 41 and slits 42 in the above-described direction causes the light passing through the slits 42 to enter into the photo sensor 41. The respective luminous energy distributions of the first and second light beam L1 and L2 bundles are then detected as outputs from the photo sensor 41 in a time series manner.

Figure 11:
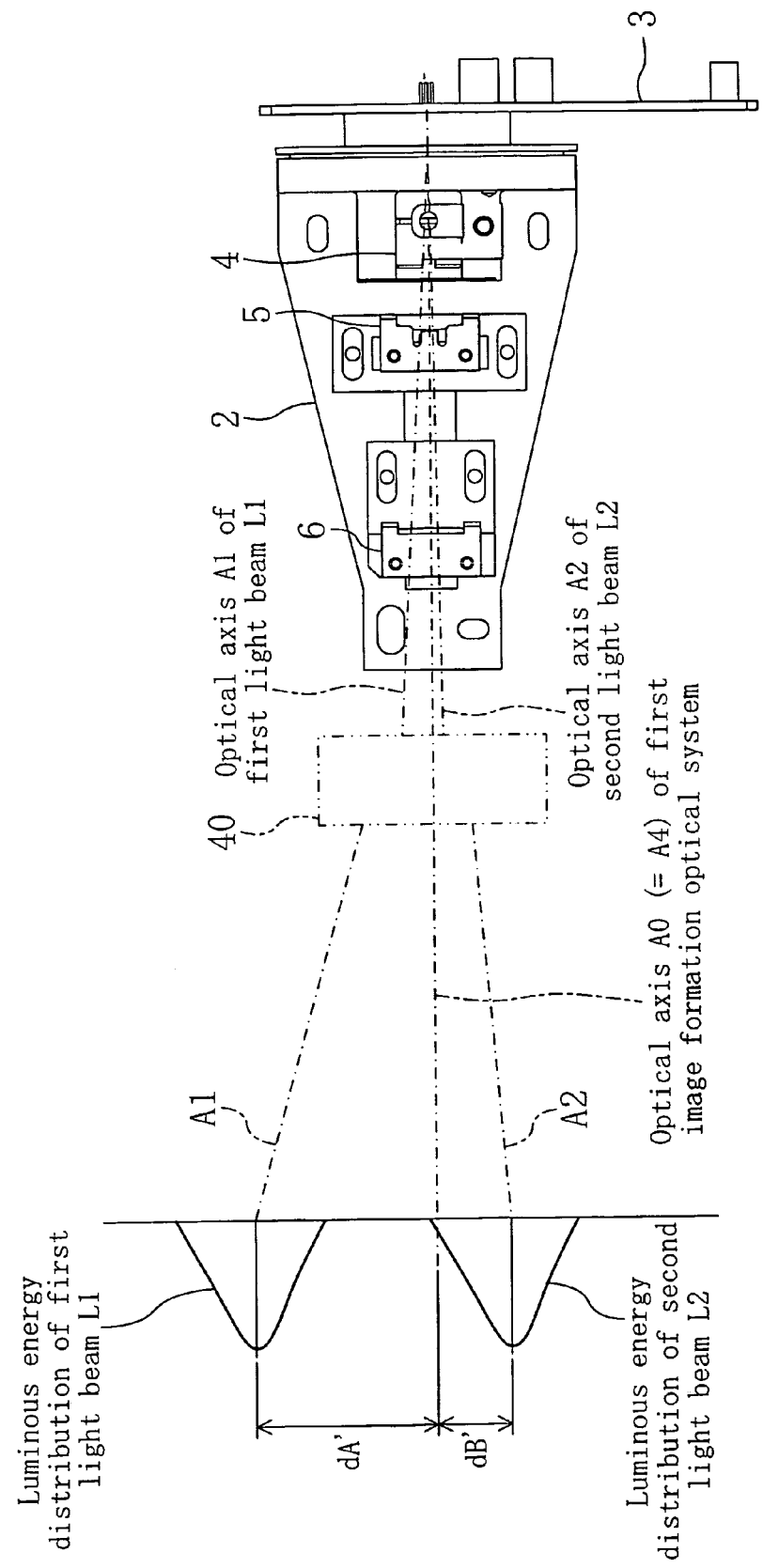
FIG. 11 is a view illustrating the first image formation optical system and power balance before optical axis adjustment is made.

FIG. 11 indicates exemplary luminous energy distributions of the light beams in a case where the optical axis of the first image formation optical system is matched with the optical axis A4 of the light source block 2. In this exemplary case, before the first and second light beams L1 and L2 enter into the magnification optical system 40, the optical axis A1 of the first light beam L1 and the optical axis A2 of the second light beam L2 are asymmetrical about the optical axis A0 of the first image formation optical system. In such a case, as shown in the distribution chart in the left-hand side of FIG. 11, the luminous energy distributions of the first and second light beams L1 and L2, detected by the photo sensor 41, are asymmetrical about the optical axis A0 of the first image formation optical system. It should be noted that the respective optical axes A1 and A2 of the light bundles are defined by the peak positions in the luminous energy distributions. If the distance between the optical axis A0 of the first image formation optical system and the optical axis A1 of the first light beam L1 is dA' and the distance between the optical axis A0 of the first image formation optical system and the optical axis A2 of the second light beam L2 is dB', the expression dA' >dB' holds in this exemplary case.

Figure 4B:
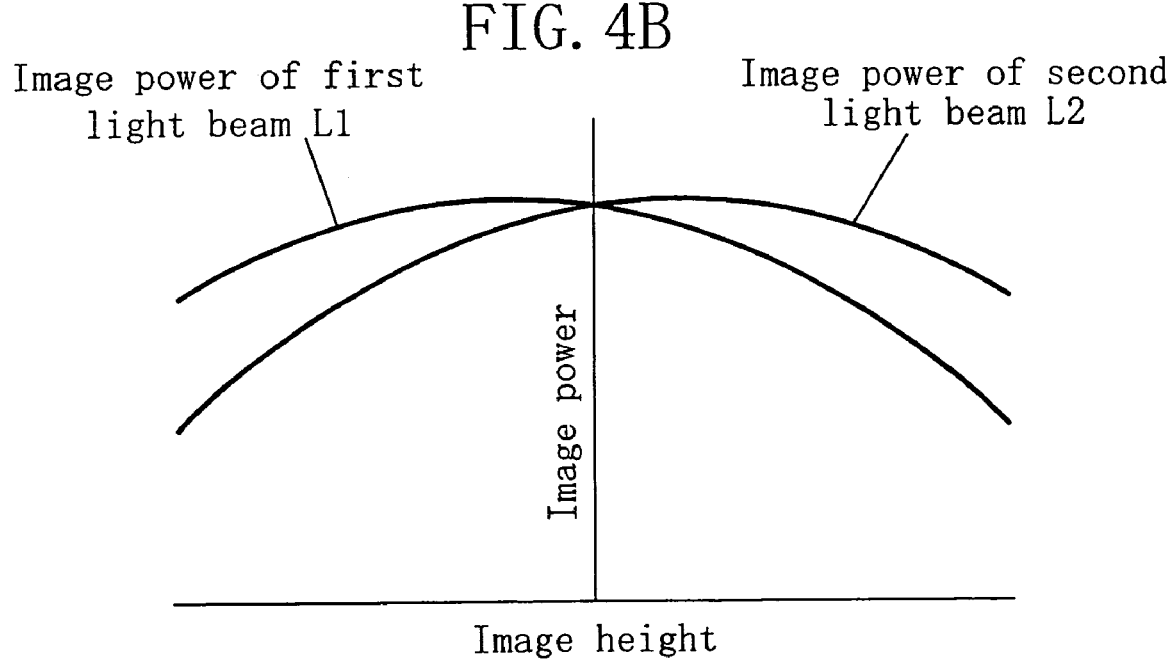
FIG. 4B indicates balance between the powers of the light beams on a scanning plane.
Figure 12:
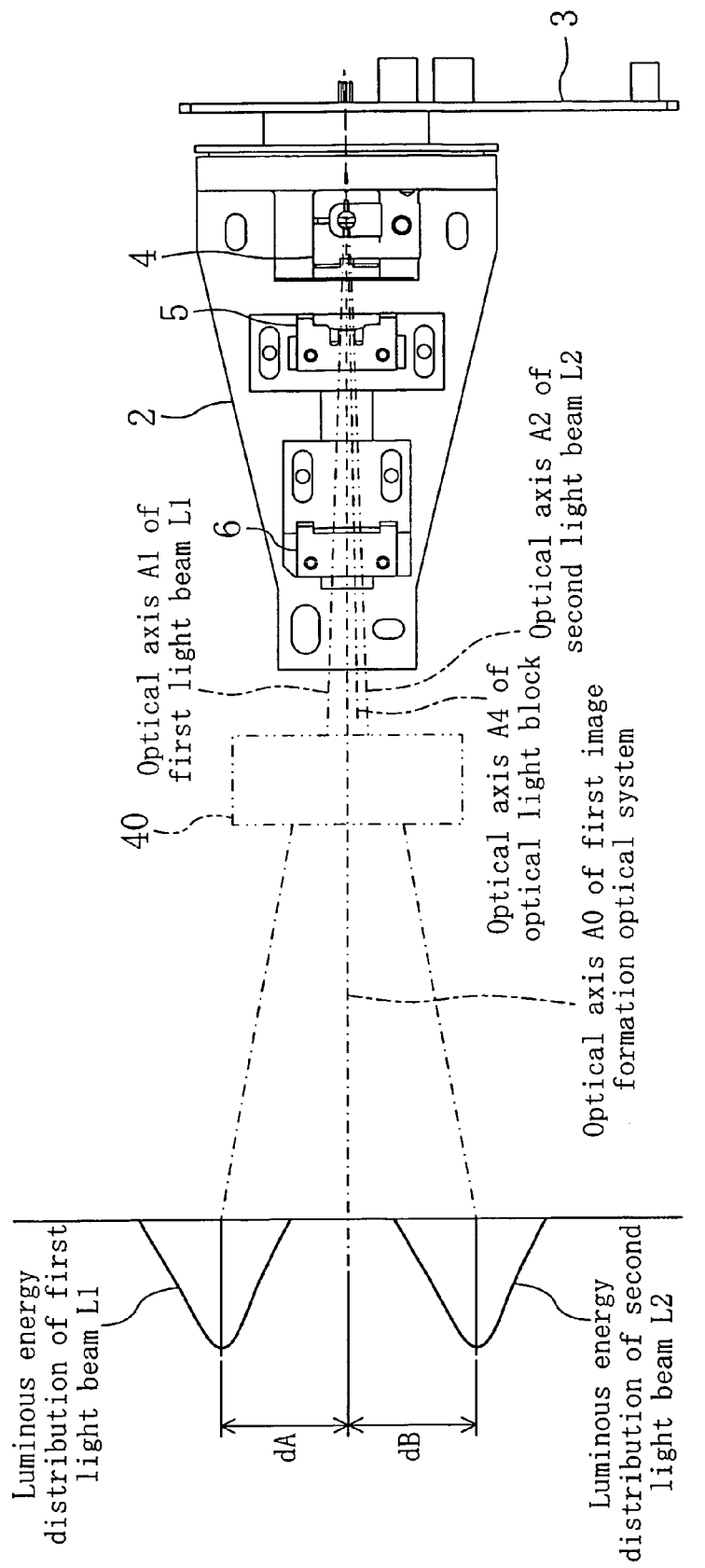
FIG. 12 is a view illustrating the first image formation optical system and power balance after the optical axis adjustment is made.

As in this case, when dA' and dB' differ from each other, the optical axis A0 of the first image formation optical system is adjusted by using the adjusting means set forth above. For instance, as shown in FIG. 12, the orientation of the light source block 2 is changed until the distance dA' and the distance dB' become approximately equal to each other. More specifically, the optical axis A0 of the first image formation optical system is tilted from the optical axis A4 of the light source block 2 so that the optical axes A1 and A2 of the first and second light beams L1 and L2 are symmetrical about the optical axis A0 of the first image formation optical system. By this tilting operation, the power of the first light beam L1 is balanced with the power of the second light beam L2 on the scanning plane, i.e., the image surface (see FIG. 4B).

In the foregoing description, the adjustments made in the scanning direction in which the light beams are scanned, i.e., in the so-called main scanning direction of the light beams have only been discussed. Hereinafter, adjustments made in the sub scanning direction of the light beams, perpendicular to the main scanning direction, will be described.

In the optical scanner 1 furnished with the light source for producing the plurality of laser beams, the spots of the laser beams are typically intended to be scanned on the scanning plane of the photosensitive drum 16 in the main scanning direction, with a predetermined distance kept between the laser beam spots in the sub scanning direction. However, due to various limitations, the actual distance between the beam spots on the scanning plane in the sub scanning direction, which is determined depending upon the distance between the light-emitting points of the light source and upon the magnification of the entire optical system, does not become the predetermined distance in some cases. In such cases, the light-emitting points are arranged in a line in a direction tilted with respect to the main scanning direction, thereby adjusting the distance between the beam spots on the scanning plane in the sub scanning direction.

Figure 13:
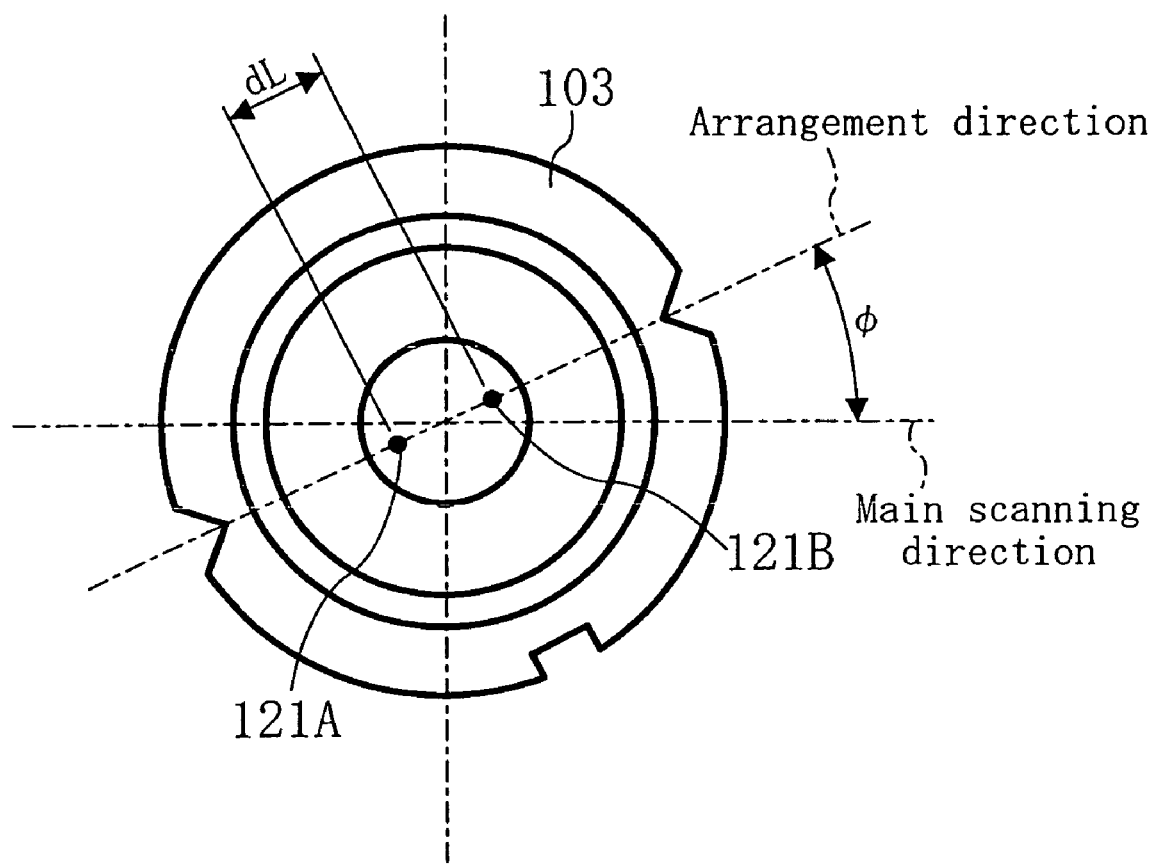
FIG. 13 indicates the locations of light-emitting points.

FIG. 13 indicates the locations of light-emitting points. The reference numeral 103 denotes a semiconductor laser serving as a multiple-light-emitting light source for producing a plurality of light beams, in which two light emitting points 121A and 121B are placed in a single package. If the distance between the light emitting points 121A and 121B is dL and the inclination, with respect to the main scanning direction, of the line connecting the centers of the two light emitting points 121A and 121B (in the direction in which the light emitting points 121A and 121B are arranged) is an angle $\Phi$, the value of $\Phi$ is determined so that the distance between the beam spots on the scanning plane in the sub scanning direction, which is determined based upon $dL \times \sin\Phi$ (wherein $dL \times \sin\Phi$ is the distance between the light emitting points 121A and 121B in the sub scanning direction) and upon the magnification of the entire optical system in the sub scanning direction, is equal to the predetermined distance. Since the tolerance of the value of $\Phi$ is very small, the value of $\Phi$ is generally adjusted highly accurately by adjusting the mounting angle of the semiconductor laser 103 onto a lens block 117 when a light source block 102 is assembled.

Next, specific adjusting means for adjusting the mounting angle of the semiconductor laser will be discussed.

Figure 14:
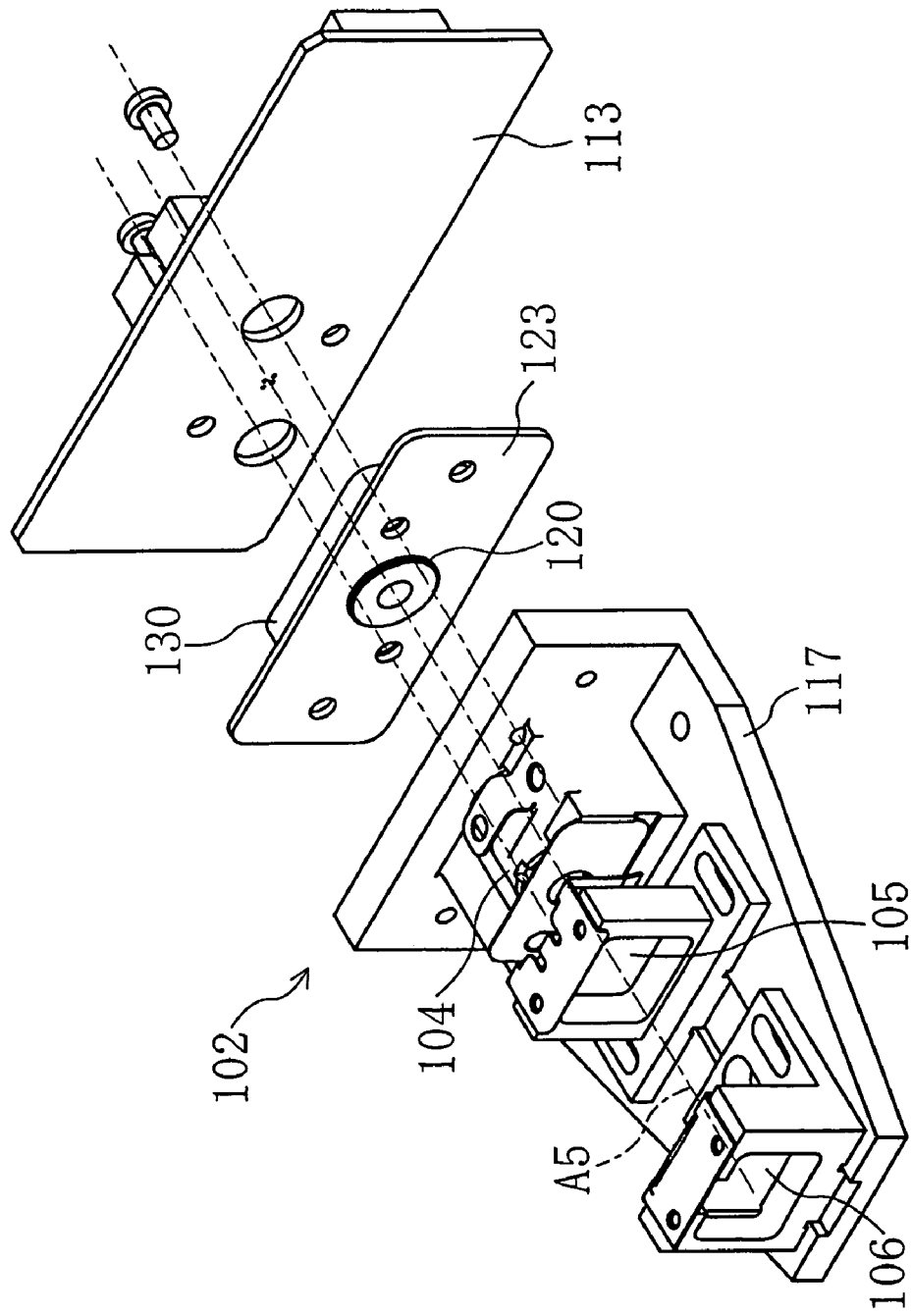
FIG. 14 is an oblique view of a light source block as seen from the front side thereof.
Figure 15:
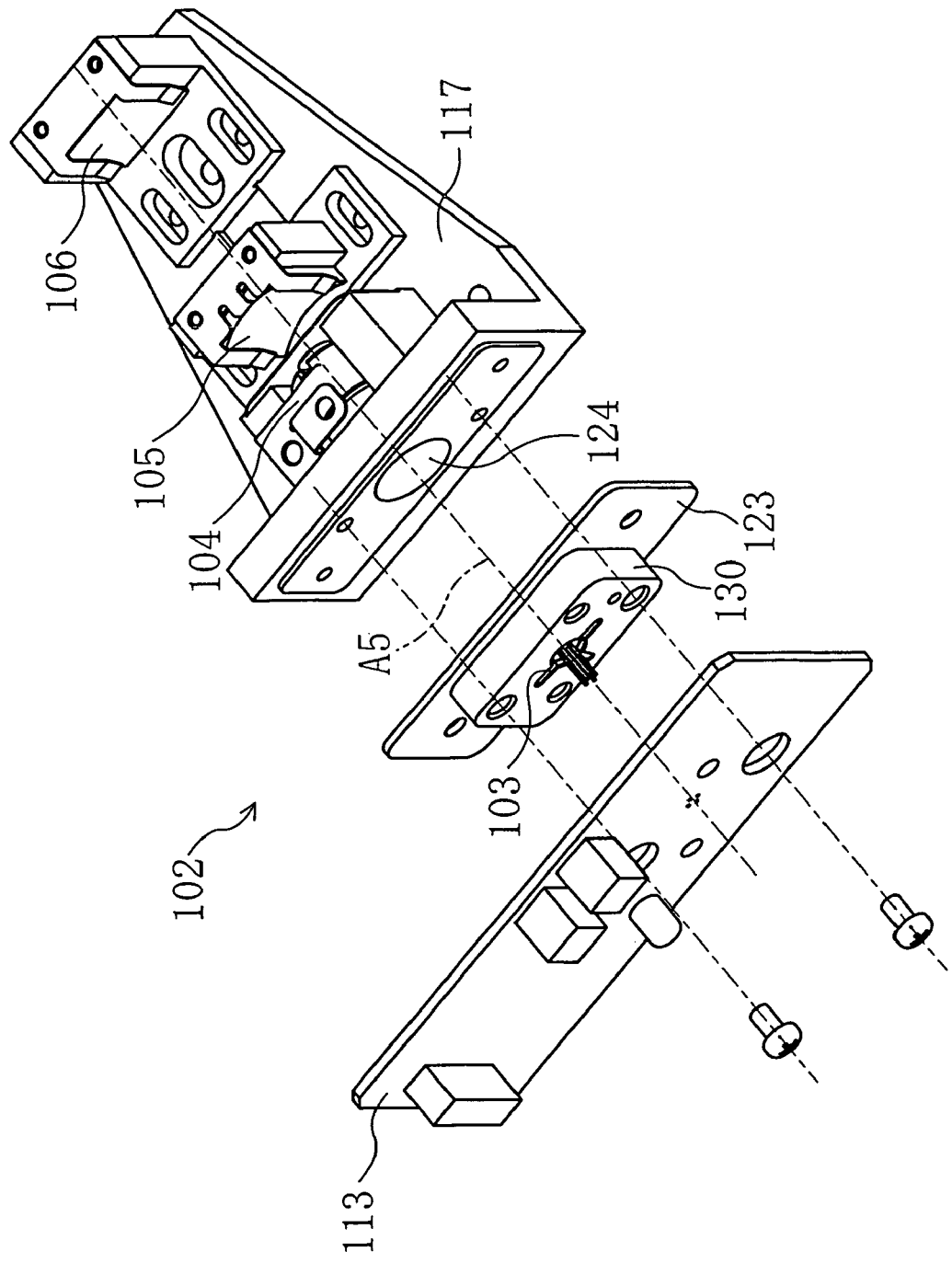
FIG. 15 is an oblique view of the light source block as seen from the rear side thereof.

FIGS. 14 and 15 are oblique views of the light source block 102 as seen from the front and rear sides thereof, respectively. The light source block 102 includes: a laser driving substrate 113, on which a semiconductor laser circuit is provided; a semiconductor laser 103; a laser holder 130 for holding the semiconductor laser 103; an angle adjusting plate 123 into which a projecting portion for fitting 120 of the laser holder 130 is fitted; and a lens block 117 including a collimator lens 104, a main concave cylinder lens 105, and a sub convex cylinder lens 106. The semiconductor laser 103 is pushed in the laser holder 130. The laser holder 130 ensures the securing of the semiconductor laser 103 to the lens block 117 and heat conduction from the semiconductor laser 103 to the laser holder 130. The laser holder 130 and the angle adjusting plate 123 are combined into one unit by a not-shown combining means. The lens block 117 has a hole for fitting 124, into which the projecting portion for fitting 120 of the laser holder 130 is fitted. With the projecting portion for fitting 120 of the laser holder 130 being fitted in the hole for fitting 124 of the lens block 117, the angle adjusting plate 123 is capable of rotating, as one unit with the laser holder 130, about the optical axis A5 of the light source block 102. The optical axis A5 is an axis assumed in the design.

Next, an exemplary method for adjusting the mounting angle of the semiconductor laser 103 will be described.

When the light source block 102 is assembled, the laser holder 130 is first secured temporarily with two screws, with the projecting portion for fitting 120 of the laser holder 130 being fitted in the hole for fitting 124 of the lens block 117. The subsequent step is to connect a not-shown laser operating device with the semiconductor laser 103 by using a socket or the like, thereby allowing the light-emitting points 121A and 121B to illuminate. The laser beams produced from the light-emitting points 121A and 121B pass through first and second image formation optical systems to become beam spots on a scanning plane. The angle adjusting plate 123 is rotated so that the distance between those beam spots on the scanning plane in the sub scanning direction is equal to a predetermined distance, thereby adjusting the mounting angle of the semiconductor laser 103. In this state, the laser holder 130 is secured. Thereafter, the first image formation optical system is adjusted by the above-mentioned adjusting means so that the powers of the two light beams are balanced with each other on the scanning plane.

If the first image formation optical system is adjusted before the adjustment of the distance between the beam spots on the scanning plane in the sub scanning direction is made, the mounting angle of the semiconductor laser 103 is changed by the adjustment of the distance between the beam spots on the scanning plane in the sub scanning direction. As a result, the balance between the powers of the light beams on the scanning plane in the main scanning direction is disrupted, which requires readjustment of the first image formation optical system.

On the other hand, when the first image formation optical system is being adjusted, the mounting angle of the semiconductor laser 103 does not change, such that the distance between the beam spots on the scanning plane in the sub scanning direction does not change. Therefore, if the distance between the beam spots on the scanning plane in the sub scanning direction is adjusted before the adjustment of the first image formation optical system is made, the respective adjustment process steps are required to be performed only one time.

As described above, according to this embodiment, a uniform distribution of luminous energy is achieved on the scanning plane in the overfilled optical scanner in which the two light beams L1 and L2 are utilized. It is thus possible to prevent quality deterioration caused by variations occurring in the luminous energy distribution. Accordingly, the speed of scanning is enhanced, while high quality is achieved.

In addition, the powers of the light beams L1 and L2 incident on the polygon mirror 9 are detected, and the optical axis A0 of the first image formation optical system is adjusted based on the detection results. Therefore, the luminous energy distribution on the scanning plane is made uniform highly accurately.

Moreover, in the optical scanner 1, the second image formation optical system is formed of the reflector 10 alone. This reduction in the number of components allows for reduction in the size of and costs for the scanner.

Furthermore, since the distance between the light beams on the scanning plane in the sub scanning direction is adjusted before the first image formation optical system is adjusted so that the powers of the light beams on the scanning plane in the scanning direction are balanced with each other. Thus, the respective adjustment process steps are required to be performed only one time.

Although in the foregoing embodiment the light source 3 produces the two light beams L1 and L2, the light source 3 may emit three or more light beams. In the case where the light source 3 emits three or more light beams, the first image formation optical system may be adjusted so that the two of the optical axes of the light beams, which are directed to the outermost ends, are approximately symmetrical about the optical axis A0 of the first image formation optical system.

Next, an embodiment of an image formation apparatus in which the optical scanner 1 is provided will be described. The image formation apparatus including the optical scanner 1 can be used for various types of image formation apparatuses such as a laser beam printer, a laser facsimile machine and a digital copy machine.

Figure 16:
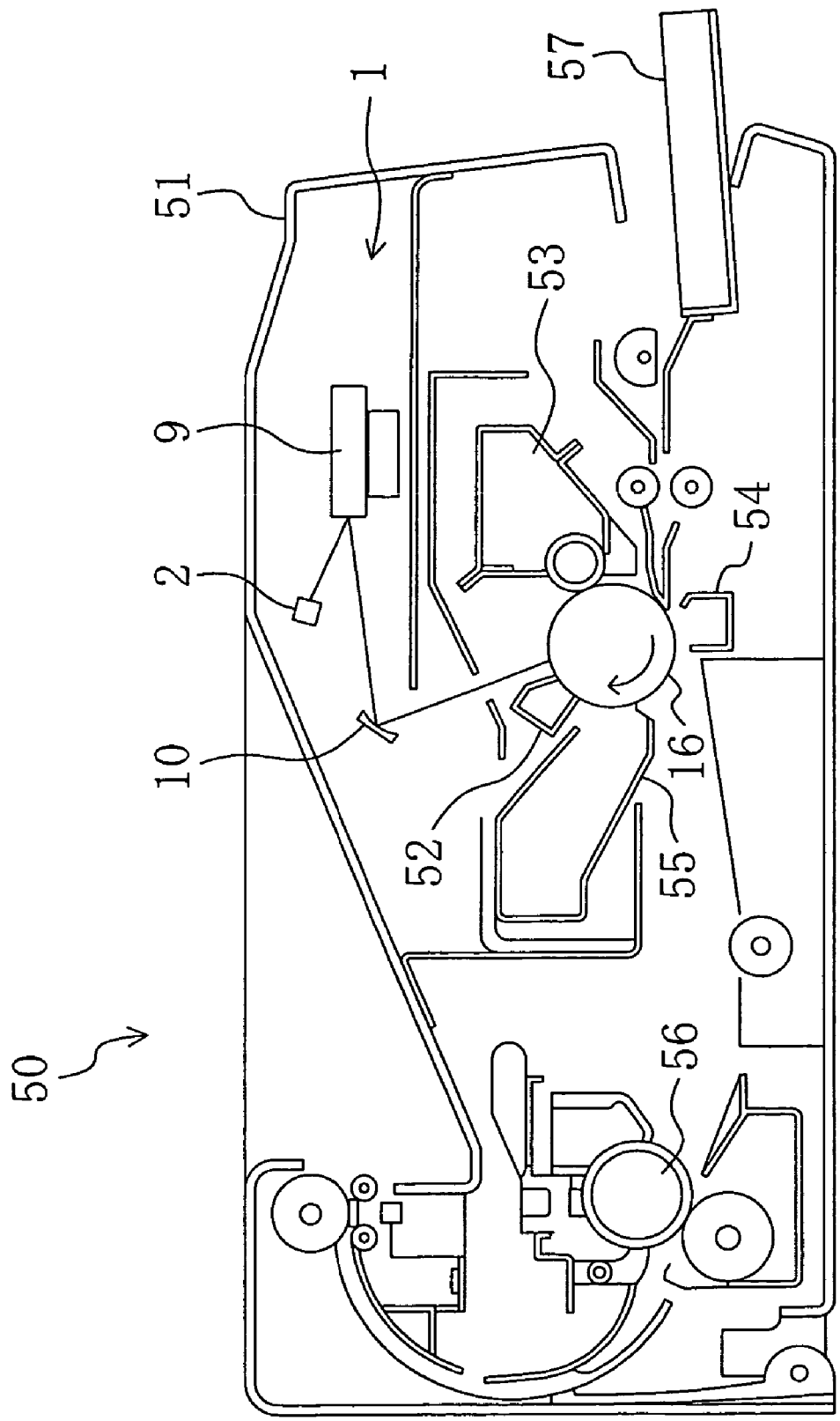
FIG. 16 is a schematic cross-sectional view of an image formation apparatus according to this embodiment.
Figure 17A:
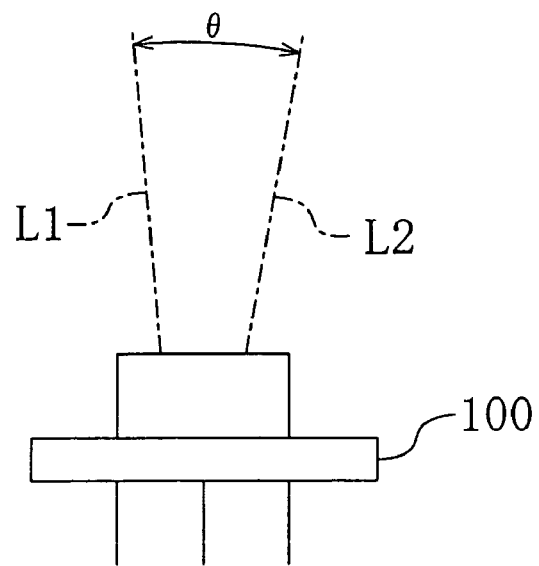
Figure 17B:
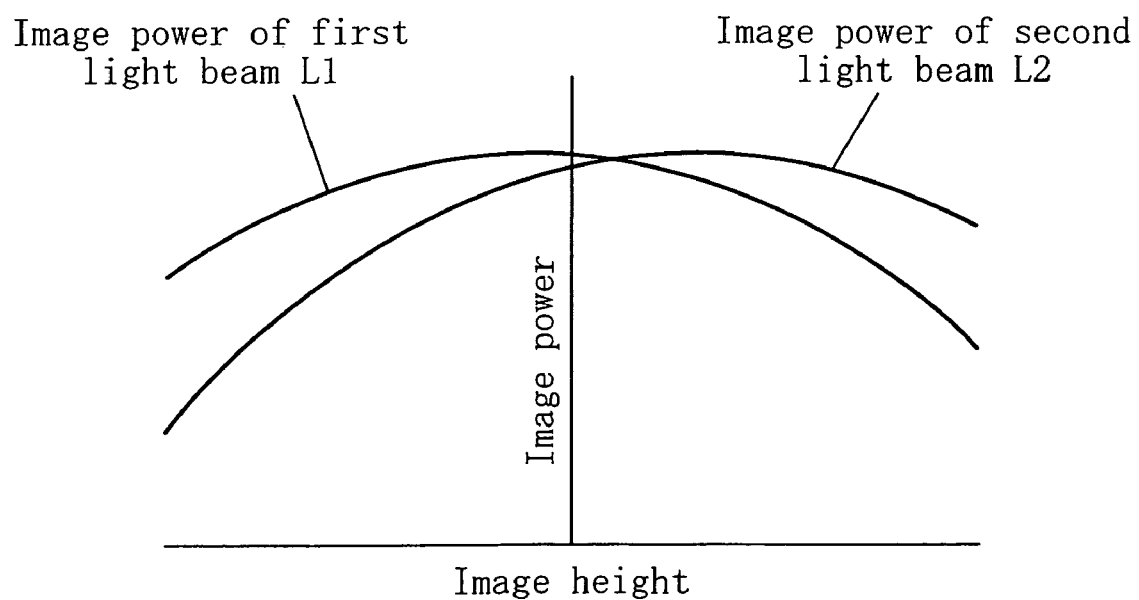
FIG. 17B is a view indicating variations in the powers of the light beams on a scanning plane.

As shown in FIG. 16, the optical scanner 1 including the light source unit 2, the polygon mirror 9 and the reflector 10 (illustration of the case 15 and other elements is omitted) is stored in a casing 51 of an image formation apparatus 50. Moreover, the casing 51 is provided therein with a photosensitive drum 16, a primary charger 52 for attaching electrostatic ions to the rim surface of the photosensitive drum 16 to cause the rim surface to be charged, a developer 53 for attaching charged toner to a printing section, a transfer charger 54 for transferring the attached toner to a print paper, a cleaner 55 for removing the remaining toner, a printer fuser 56 for fusing the transferred toner into the print paper, and a paper feed cassette 57.

In the image formation apparatus 50, image forming speed is enhanced and image quality is increased, because the above-described optical scanner 1 is used.

It is obvious that the present invention is not limited to the embodiments described above but may be embodied in various other forms without departing from the spirit and the principal feature thereof.

Therefore, the embodiments described above are given merely by way of example in all respects and are not to be construed as limitation. The scope of the invention is indicated by the appended claims and is not restricted by the forgoing description. All changes and modifications which come within the meaning and range of equivalents of the appended claims are intended to fall within the scope of the invention.

As has been described, the present invention is useful for an image formation apparatus such as a laser beam printer, a laser facsimile machine and a digital copy machine, and an optical scanner used in the image formation apparatus.

What is claimed is:

1. An optical scanner comprising:
a light source for emitting a plurality of light beams;
an optical deflector for scanning the light beams from the light source;
a first image formation optical system, arranged between the light source and the optical deflector, for leading the light beams from the light source to a deflecting plane of the optical deflector and for forming, on the deflecting plane, a line image whose width is greater than the plane width of the deflecting plane; and
a second image formation optical system, arranged between the optical deflector and a scanning plane to be scanned, for leading the light beams from the optical deflector to the scanning plane and forming an image on the scanning plane,
wherein optical axes of the respective light beams are defined by peak positions in the luminous energy distributions, and
the first image formation optical system is adjusted so that two of the optical axes of the light beams, directed to outermost ends, are approximately symmetrical about an optical axis of the first image formation optical system in a main scanning direction.

2. An optical scanner comprising:
a light source for emitting two light beams;
an optical deflector for scanning the light beams from the light source;
a first image formation optical system, arranged between the light source and the optical deflector, for leading the light beams from the light source to a deflecting plane of the optical deflector and for forming, on the deflecting plane, a line image whose width is greater than the plane width of the deflecting plane; and
a second image formation optical system, arranged between the optical deflector and a scanning plane to be scanned, for leading the light beams from the optical deflector to the scanning plane and forming an image on the scanning plane,
wherein optical axes of the respective light beams are defined by peak positions in the luminous energy distributions, and
the first image formation optical system is adjusted so that the optical axes of the two light beams are approximately symmetrical about an optical axis of the first image formation optical system in a main scanning direction.

3. The scanner of claim 1, further comprising:
a collimator lens for converting the light beams emitted from the light source into parallel rays, and
a moving mechanism for moving the light source from an optical axis of the collimator lens in the main scanning direction for said adjustment of the first image formation optical system.

4. The scanner of claim 2, further comprising:
a collimator lens for converting the light beams emitted from the light source into parallel rays, and
a moving mechanism for moving the light source from an optical axis of the collimator lens in the main scanning direction for said adjustment of the first image formation optical system.

5. The scanner of claim 1, further comprising:
a lens through which the light beams emitted from the light source pass and which has a power in the main scanning direction, and
a moving mechanism for moving the lens in the main scanning direction for said adjustment of the first image formation optical system.

6. The scanner of claim 2, further comprising:
a lens through which the light beams emitted from the light source pass and which has a power in the main scanning direction, and
a moving mechanism for moving the lens in the main scanning direction for said adjustment of the first image formation optical system.

7. The scanner of claim 1, further comprising:
a deflecting mirror for deflecting the light beams emitted from the light source, and
an angle changing mechanism for changing an angle at which the deflecting mirror deflects the light beams with respect to the main scanning direction for said adjustment of the first image formation optical system.

8. The scanner of claim 2, further comprising:
a deflecting mirror for deflecting the light beams emitted from the light source, and
an angle changing mechanism for changing an angle at which the deflecting mirror deflects the light beams with respect to the main scanning direction for said adjustment of the first image formation optical system.

9. The scanner of claim 1, further comprising:
a collimator lens for converting the light beams emitted from the light source into parallel rays;
a light source block for holding at least the light source and the collimator lens; and
an orientation changing mechanism for changing the orientation of the light source block with respect to the main scanning direction for said adjustment of the first image formation optical system.

10. The scanner of claim 2, further comprising:
a collimator lens for converting the light beams emitted from the light source into parallel rays;
a light source block for holding at least the light source and the collimator lens; and
an orientation changing mechanism for changing the orientation of the light source block with respect to the main scanning direction for said adjustment of the first image formation optical system.

11. The scanner of claim 1, further comprising:
a collimator lens for converting the light beams emitted from the light source into parallel rays;
a light source block for holding at least the light source and the collimator lens; and
a moving mechanism for moving the light source block in the main scanning direction for said adjustment of the first image formation optical system.

12. The scanner of claim 2, further comprising:
a collimator lens for converting the light beams emitted from the light source into parallel rays;
a light source block for holding at least the light source and the collimator lens; and
a moving mechanism for moving the light source block in the main scanning direction for said adjustment of the first image formation optical system.

13. The scanner of claim 1, wherein powers of the light beams incident upon the optical deflector are detected and said adjustment of the first image formation optical system is made based on the detection.

14. The scanner of claim 2, wherein powers of the light beams incident upon the optical deflector are detected and said adjustment of the first image formation optical system is made based on the detection.

15. The scanner of claim 1, wherein the second image formation optical system is formed of a reflector having a reflection plane formed of a curved plane which has a long side extending in the main scanning direction in which the light beams are scanned and a positive power at least in the main scanning direction.

16. The scanner of claim 2, wherein the second image formation optical system is formed of a reflector having a reflection plane formed of a curved plane which has a long side extending in the main scanning direction in which the light beams are scanned and a positive power at least in the main scanning direction.

17. An image formation apparatus comprising:
the optical scanner of claim 1;
an approximately cylindrical photosensitive body whose rim surface forms the scanning plane to be scanned and which extends in the main scanning direction in which a ray bundle is scanned in the optical scanner;
a driving mechanism for rotating the photosensitive body;
a developer for supplying toner to the photosensitive body; and
transferring device for transferring a toner image formed on the photosensitive body to a recording medium.

18. An image formation apparatus comprising:
the optical scanner of claim 2;
an approximately cylindrical photosensitive body whose rim surface forms the scanning plane to be scanned and which extends in the main scanning direction in which a ray bundle is scanned in the optical scanner;
a driving mechanism for rotating the photosensitive body;
a developer for supplying toner to the photosensitive body; and
transferring device for transferring a toner image formed on the photosensitive body to a recording medium.

19. The scanner of claim 1, wherein the light source is formed of a multiple-light-emitting light source having a plurality of light emitting points arranged in a line and each emitting a corresponding one of the light beams;
the scanner further includes:
a light source holder for holding the multiple-light-emitting light source in such a manner that the direction in which the light emitting points are arranged is inclined with respect to the main scanning direction in which the light beams are scanned, and
an adjustment mechanism for adjusting the inclination angle of the light-emitting-point arrangement direction with respect to the main scanning direction; and
after the adjustment mechanism adjusts the inclination angle to thereby adjust a distance between the light beams on the scanning plane in a sub scanning direction perpendicular to the main scanning direction, said adjustment of the first image formation optical system is made.

20. The scanner of claim 2, wherein the light source is formed of a multiple-light-emitting light source having two light emitting points arranged in a line and each emitting a corresponding one of the light beams;
the scanner further includes:
a light source holder for holding the multiple-light-emitting light source in such a manner that the direction in which the light emitting points are arranged is inclined with respect to the main scanning direction in which the light beams are scanned, and
an adjustment mechanism for adjusting the inclination angle of the light-emitting-point arrangement direction with respect to the main scanning direction; and
after the adjustment mechanism adjusts the inclination angle to thereby adjust a distance between the light beams on the scanning plane in a sub scanning direction perpendicular to the main scanning direction, said adjustment of the first image formation optical system is made.

21. The scanner of claim 19, wherein the second image formation optical system is formed of a reflector having a reflection plane formed of a curved plane which has a long side extending in the main scanning direction in which the light beams are scanned and a positive power at least in the main scanning direction.

22. The scanner of claim 20, wherein the second image formation optical system is formed of a reflector having a reflection plane formed of a curved plane which has a long side extending in the main scanning direction in which the light beams are scanned and a positive power at least in the main scanning direction.

23. An image formation apparatus comprising:

the optical scanner of claim 19;

an approximately cylindrical photosensitive body whose rim surface forms the scanning plane to be scanned and which extends in the main scanning direction in which a ray bundle is scanned in the optical scanner;

a driving mechanism for rotating the photosensitive body;

a developer for supplying toner to the photosensitive body; and transferring device for transferring a toner image formed on the photosensitive body to a recording medium.

24. An image formation apparatus comprising:

the optical scanner of claim 20;

an approximately cylindrical photosensitive body whose rim surface forms the scanning plane to be scanned and which extends in the main scanning direction in which a ray bundle is scanned in the optical scanner;

a driving mechanism for rotating the photosensitive body;

a developer for supplying toner to the photosensitive body; and transferring device for transferring a toner image formed on the photosensitive body to a recording medium.

* * * * *